Sept. 18, 1928.
A. STEGER
1,684,690
ANTIGLARE SHIELD FOR VEHICLES
Filed Feb. 18, 1927
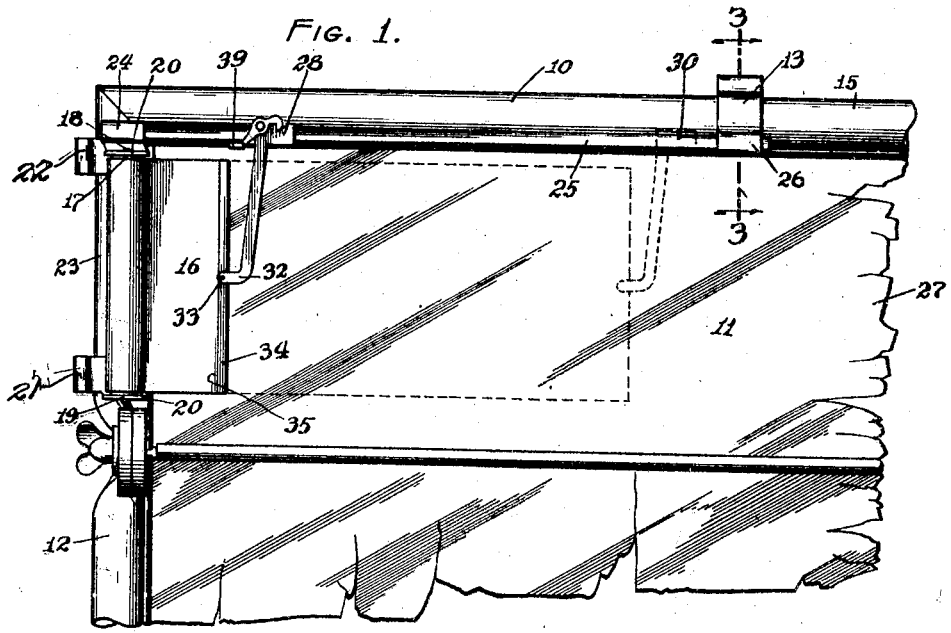
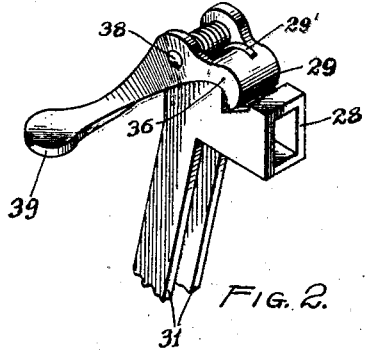
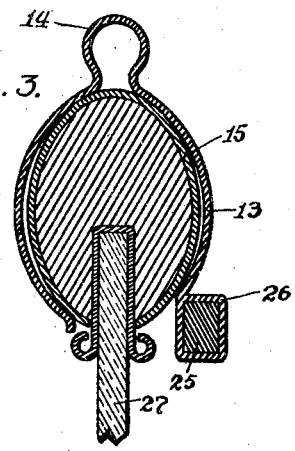
Alex Steger
INVENTOR
BY Victor J. Evans
ATTORNEY Patented Sept. 18, 1928.

1,684,690

UNITED STATES PATENT OFFICE.

ALEX STEGER, OF VINING, MINNESOTA.

ANTIGLARE SHIELD FOR VEHICLES.

Application filed February 18, 1927. Serial No. 169,293.

This invention relates to certain novel improvements in anti-glare shields for vehicles and has for its principal object the provision of an improved construction of this character which will be highly efficient in use and economical in manufacture.

Among the salient objects of the invention is the provision of a shield which may be moved into and from shielding position with respect to a wind shield of a vehicle.

A still further object of the invention is the novel combination and arrangement of parts for associating an anti-glare shield with a wind shield of a vehicle whereby the shield may be moved into and from shielding position and locked in shielding position.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a fragmentary inside elevational view of a wind shield showing my invention associated therewith;

Fig. 2 is a perspective view of a locking arrangement embodied in the invention; and Fig. 3 is a sectional detail view taken substantially on line 3—3 of Fig. 1.

Referring to the drawing, 10 indicates the upper frame section of a wind shield 11 of an automobile. This upper frame section 10 is pivotally connected to the lower frame section 12 in a well-known manner.

My improved anti-glare shield includes a clip member 13 which is formed from a piece of resilient metal bent substantially U shaped with the bight portion 14 thereof rolled to provide a hand gripping portion. This clip 13 is adapted to frictionally engage the upper rail 15 of the section 10.

The shield is indicated at 16 and is preferably formed of translucid material and adapted for rolling upon a roller 17 having at its opposite end portions trunnions 18. These trunnions 18 are adapted to engage in openings 19 formed in brackets 20. These brackets 20 are formed as an integral part of clips 21 and 22, substantially similar in structure to the clip 13. These clips 21 and 22 are adapted to frictionally engage one of the side rails 23 of the section 10. The clip 22 has formed as an integral part thereof a sleeve 24 adapted to frictionally receive one end portion of a runner bar 25. The clip 13 has one of its limb portions provided with a sleeve 26 which is adapted to frictionally receive the opposite end portion of the runner bar 25, said sleeves 24 and 26 being disposed a predetermined distance from the wind shield glass 27 and adapted to hold the runner bar 25 against longitudinal shifting.

Mounted upon the bar 25 is a carriage sleeve 28 having a transverse slot 29 formed in its top wall. This slot 29 is adapted under certain condition to register with a notch 30 formed in the inner end portion of the bar 25. Formed as an integral part of the carriage sleeve 28 are parallel arms 31 having angled end portions 32 adapted for connection as at 33 to the intermediate portion of a stiffening plate 34 secured to the free end portion 35 of the shield 16.

Mounted on the carriage sleeve 28 is a pawl 36 engaging in the slot 29. This pawl 36 is held in engagement in said slot 29 through the medium of a spring 29' having one end portion secured to the pintle 38 in a well-known manner and its opposite end portion bearing against the pawl.

Formed as an integral part of the pawl 36 is a finger 39 adapted for operation upon by the finger of the driver of the vehicle to disengage the pawl 36 from pawl latching position.

In use the shield 16 is normally wound upon the roller 17. The driver of the vehicle to shield his eyes from the bright lights of an oncoming vehicle, moves the carriage sleeve 28 inwardly upon the bar 25 to unwind the shield from rolled position upon the roller.

When the carriage sleeve latches the inner end portion of the bar 25 the pawl will engage the notch 30 and retain the shield in shielding position over the corner of the wind shield glass. To permit retroactive movement of the shield the driver presses his finger on the finger 39 to disengage the pawl from the notch 30. When the pawl is disengaged from the notch 30 the shield will be wound upon the roller 17 which in the present instance is of a well-known spring type roller.

From the above description taken in connection with the accompanying drawing it will be manifest that I provide a simple arrangement for moving the shield 16 into and from shielding position whereby to effectively shield the bright lights of vehicles from the eyes of the driver.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. The combination with a wind shield glass of a vehicle, a clip secured to the top frame member of the wind shield and having a portion providing a sleeve, a roller, clips secured to one of the side frames of the wind shield and providing brackets for rotatably supporting said roller, one of said clips having a portion providing a sleeve, a guide bar having one end portion inserted in the first mentioned sleeve and an opposite end portion inserted in the second mentioned sleeve, a carriage sleeve movable longitudinally with respect to the guide bar and having depending arms, a translucid shield secured to the roller for winding thereon, and a reenforcing strap connected to said arms and to the unsecured edge portion of said translucid shield.

2. The combination with a wind shield glass of a vehicle, a clip secured to the top frame member of the wind shield and having a portion providing a sleeve, a roller, clips secured to one of the side frames of the wind shield and providing brackets for rotatably supporting said roller, one of said clips having a portion providing a sleeve, a guide bar having one end portion inserted in the first mentioned sleeve and an opposite end portion inserted in the second mentioned sleeve and having a notch formed in said first mentioned end portion, and a spring controlled pawl carried by the carriage sleeve and adapted to engage said notch for retaining said translucid shield in shielding position over a portion of the glass of the wind shield, said pawl having an integral portion providing a finger piece to permit manual disengagement of the pawl from said notch, a carriage sleeve movable longitudinally with respect to the guide bar and having depending arms, a translucid shield secured to the roller for winding thereon, and a reenforcing strap connected to said arms and to the unsecured edge portion of said translucid shield.

In testimony whereof I affix my signature.

ALEX STEGER.